(No Model.)

A. J. McADAM.
AUXILIARY VALVE FOR ELEVATORS.

No. 484,223. Patented Oct. 11, 1892.

Witnesses:

Inventor,
Alexander J. McAdam
by Dewey & Co.,
attys

UNITED STATES PATENT OFFICE.

ALEXANDER J. McADAM, OF SAN FRANCISCO, CALIFORNIA.

AUXILIARY VALVE FOR ELEVATORS.

SPECIFICATION forming part of Letters Patent No. 484,223, dated October 11, 1892.

Application filed November 12, 1891. Serial No. 411,716. (No model.)

*To all whom it may concern:*

Be it known that I, ALEXANDER J. MCADAM, a citizen of the United States, residing in the city and county of San Francisco, State of California, have invented an Improvement in Auxiliary Valves for Elevators; and I hereby declare the following to be a full, clear, and exact description of the same.

My invention relates to the class of elevators; and it consists in the novel auxiliary valve and the mechanism for operating it hereinafter fully described and specifically claimed.

The object of my invention is to provide simple and effective means for operating the main valve from the cage or car.

Figure 1:
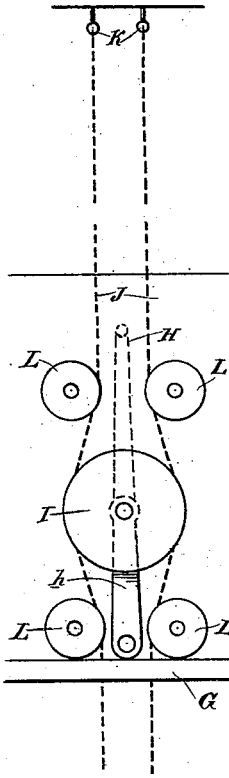
Figure 2:
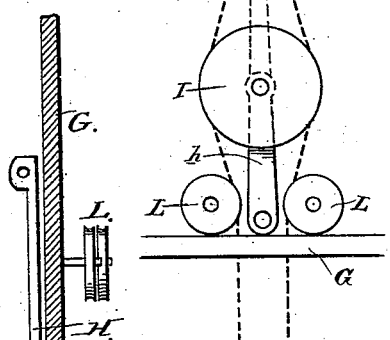
Figure 3:
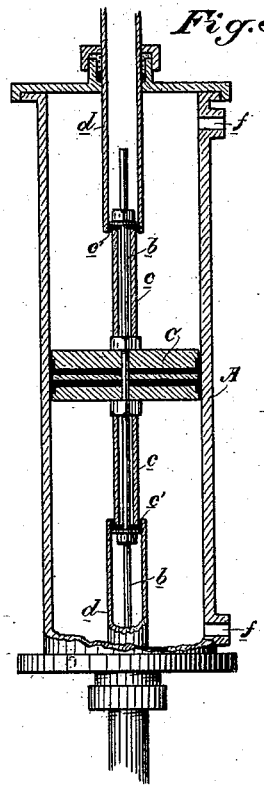
Figure 4:
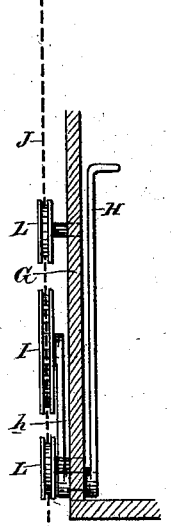
Figure 5:
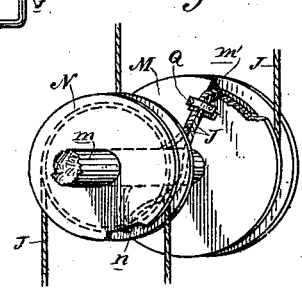

Referring to the accompanying drawings for a more complete explanation of my invention, Figure 1 is a side elevation of my valve and operating mechanism. Fig. 2 is a front elevation of same. Fig. 3 is a vertical section of the valve A. Fig. 4 is a perspective view showing the passage of cable J over pulleys M and N. Fig. 5 is a detail showing the presser-pulleys I, the fixed pulleys L, and their connections.

A is the fixed cylinder of my auxiliary valve, located in proper and convenient position with relation to the main valve B, which is here indicated generally, and may consist of any suitable construction of water-controlling valve. The stem $b$ of the main valve extends therefrom and passes into and through the cylinder A of the auxiliary valve. Secured to the main stem $b$ and within the cylinder A is a sleeve $c$, which carries at its middle a piston C, fitted and adapted to move in the cylinder A. Upon each end of the sleeve $c$ is a packing-washer $c'$.

D is a sliding bar seated in a bracket E on the exterior of the cylinder A, said bar being hollow. With its ends are connected and communicate the pipes $d$, said pipes extending inwardly into each end of cylinder A and having open inner ends adapted to fit over the packing-washers $c'$ on the ends of the sleeve $c$, and when so fitted to form a tight joint therewith, so that said washers close and plug the pipes $d$.

F is a water-supply pipe having branches $f$ extending into each end of the cylinder A, said branches being controlled by suitable cocks or valves $f'$. The hollow bar or pipe D has a discharge or waste extension $d'$, as shown, into which it telescopes with a suitably-packed joint.

The operation of this valve as far as described is as follows: Water from pipe F and branch pipes $f$ is normally supplied to and kept in the cylinder A on each side of the piston C, and, the pressure being equal, said piston remains in a state of rest. Now if the hollow slide bar or pipe D be moved downwardly the upper pipe $d$, connected with said pipe D, will also move downwardly and will simply fit farther over the washer $c'$, and will still be plugged and closed, thus confining the water still within the upper compartment of the cylinder; but the lower pipe $d$, also moving downwardly, removes its open inner end from the washer $c'$, thereby opening said inner end and allowing the water to exhaust from the compartment of the cylinder A under the piston C, said water passing out through the lower pipe $d$ into the lower end of pipe D and out through the exhaust or waste extension $d'$. The pressure being thus relieved from under the piston C, said piston will at once move downwardly and will carry with it the stem $b$ of the main valve, thereby opening or closing said valve, as the case may be. This downward movement of the piston C closes at the end of its stroke the lower pipe $d$, so that the cylinder A is again closed. Now when the pipe D is lifted the lower compartment of cylinder A remains closed, while the upper compartment is opened by the removal of the upper pipe $d$ from the washer $c'$, and the water from said compartment passes out through pipe $d$ into pipe D and out through the waste extension $d'$. This has the effect of causing the pressure in the lower compartment to raise piston C, and thereby to lift the main valve-stem $b$ and operate the main valve B in the other direction.

As far as the construction of the auxiliary valve A is concerned, it is evident that I may employ any suitable mechanism for moving the framework or controlling mechanism, consisting of the pipes D and $d$. I prefer, however, the following novel mechanism for effecting this operation from the cage or car.

G represents a portion of the framework of the cage or car. Within the cage or car is an operating-lever H, connected at its lower end with an exterior extension h, which rocks with the main lever. This extension carries two presser-pulleys I. Mounted in the shaft in which the cage or car of the elevator works is a rope or cable J. The ends of this are secured above, as shown at the points K, to a fixed piece, and the folds of said rope thence extend downwardly and are guided by fixed pulleys L, one fold down past a side of one of the presser-pulleys I and the other fold past the side of the other pulley I, down to a pulley M on a shaft m, carried by the bracket E on the side of the cylinder A. This shaft also carries a pinion O, said pinion engaging with rack-teeth $d^2$ on the face of the sliding pipe D, which is preferably made square in cross-section. By pulling up on either side of rope or cable J the pulley M is turned and rocks the shaft m sufficiently to move the pipe D up or down; but in order to keep a tension on rope or cable J, I have the following construction: On shaft m is a pulley N. The folds of the rope pass around the pulley M in opposite directions, and the bight of said rope is thence carried sidewise out through an opening $m'$ in the side of said pulley to and through opening n in the side of pulley N, and thence passes around the face of said pulley N in opposite directions and down to and around a pulley P, from which a weight W is suspended. A clamp Q is fitted to both folds of the rope at a point between the two pulleys M and N.

The operation is as follows: When the lever H is moved in one direction, one of the pulleys I, carried by its exterior extension h, is forced over into contact with one side of the rope or cable J, thereby pressing said side outwardly and lifting up on the rope or cable, the other side being relieved and kept taut by the weight W below. This has the effect of rocking the shaft m through pulley M, and the movement of the shaft, acting through the pinion O and rack-teeth $d^2$, effects the movement of the sliding pipe D to operate the auxiliary valve, as heretofore described.

The peculiar construction of the lever H in the car and the presser-pulleys I, carried by it, provides for the movement of said pulley up and down with the cage or car independently of the cable or rope J, and the action may be had at any point in the travel of the cage or car, as the cable or rope J extends the entire height of the shaft.

The suspended weight W keeps the rope or cable under the required tension.

The object of clamp Q is to hold the two folds of the bight of the rope or cable together tightly, so that the weight will act equally upon them and cause the rope or cable to maintain its proper position on pulley M, so that it will have the same throw every time.

Having thus described my invention, what I claim as new, and desire to secure by Letters Patent, is—

1. An auxiliary valve for elevators, consisting of a cylinder, a reciprocating piston therein connected with the stem of the main valve, a water-inlet into each end of the cylinder on each side of the piston, and an exhaust mechanism for alternately exhausting the water from the cylinder on each side of the piston, consisting of a reciprocating pipe-frame adapted to open and close alternately each end of the cylinder, substantially as herein described.

2. An auxiliary valve for elevators, consisting of a cylinder, a reciprocating piston within it connected with the stem of the main valve, a water-inlet communicating with each end of the cylinder on each side of the piston, and sliding or reciprocating exhaust-pipes passing into each end of the cylinder and adapted to be alternately opened and closed to control the cylinder on each side of the piston, substantially as herein described.

3. An auxiliary valve for elevators, consisting of a cylinder, a reciprocating piston therein, a water-inlet to each end of the cylinder, a sleeve connected with each side of the piston and secured to the stem of the main valve, and the reciprocating and communicating pipes d, extending into each end of the cylinder and adapted to alternately fit over and be removed from the sleeves of the piston therein, whereby they are alternately opened and closed, substantially as herein described.

4. An auxiliary valve for elevators, consisting of a cylinder, a reciprocating piston therein, a water-inlet to each end of the cylinder, a sleeve connected with each side of the piston and secured to the stem of the main valve, a washer on each end of the sleeve, and the reciprocating and communicating pipes d, extending into each end of the cylinder and adapted to alternately fit over and be removed from the sleeve of the piston therein, whereby they are alternately opened and closed by the washers, substantially as herein described.

5. An auxiliary valve for elevators, consisting of a cylinder, a reciprocating piston therein having the oppositely-extending sleeve, said sleeve being connected with the stem of the main valve, a water-inlet to each end of the cylinder, an exterior sliding pipe D, and the pipes d, connected with each end of the pipe D and entering the ends of the cylinder and adapted to fit over the ends of the sleeve of the piston, whereby they are alternately opened and closed, substantially as herein described.

In witness whereof I have hereunto set my hand.

ALEXANDER J. McADAM.

Witnesses:
S. H. NOURSE,
H. F. ASCHECK.